US008116973B2

(12) United States Patent
Soma et al.

(10) Patent No.: US 8,116,973 B2
(45) Date of Patent: Feb. 14, 2012

(54) VEHICULAR DISPLAY DEVICE, METHOD OF CONTROLLING THE SAME, PROGRAM, AND STORAGE MEDIUM HAVING PROGRAM STORED THEREIN

(75) Inventors: Takaya Soma, Toyota (JP); Toshiaki Niwa, Okazaki (JP); Kazuya Kato, Okazaki (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 547 days.

(21) Appl. No.: 12/310,438

(22) PCT Filed: Jul. 12, 2007

(86) PCT No.: PCT/JP2007/064302
§ 371 (c)(1),
(2), (4) Date: Feb. 25, 2009

(87) PCT Pub. No.: WO2008/038449
PCT Pub. Date: Apr. 3, 2008

(65) Prior Publication Data
US 2010/0010697 A1    Jan. 14, 2010

(30) Foreign Application Priority Data
Sep. 28, 2006 (JP) .................... 2006-264811

(51) Int. Cl.
*G01C 21/00* (2006.01)
*G08G 1/968* (2006.01)
(52) U.S. Cl. ......... 701/200; 701/22; 701/28; 340/995.1; 340/995.19

(58) Field of Classification Search .......... 701/200–202, 701/22–23, 25–26, 28, 211; 340/995.1, 995.14, 340/995.19
See application file for complete search history.

(56) References Cited

U.S. PATENT DOCUMENTS
5,428,545 A  *  6/1995  Maegawa et al. ............. 701/210
(Continued)

FOREIGN PATENT DOCUMENTS
JP    A-09-147294    6/1997
(Continued)

OTHER PUBLICATIONS
Notice of Patent Examination Result for corresponding Korean Patent Application No. 10-2009-7008612, mailed on Feb. 18, 2011 (w/ English translation).

*Primary Examiner* — Yonel Beaulieu
(74) *Attorney, Agent, or Firm* — Oliff & Berridge, PLC

(57) ABSTRACT

A vehicle has a plurality of traveling modes. A display device for the vehicle comprises: a display unit displaying map information; and a control unit causing the display unit to display recognizably, at a portion of roads in the map information, traveling modes that correspond to the roads. Preferably, the control unit sets a destination in response to an instruction received from an operator, searches for a traveling route extending from a starting point to the destination, divides the traveling route into segments, and associates one of the traveling modes with each of the segments. More preferably, the control unit causes the display unit to display the plurality of candidate traveling routes, each with the traveling mode overlaid thereon, and selects in response to an instruction of the operator one traveling route planned to be taken among the plurality of candidate traveling routes.

20 Claims, 8 Drawing Sheets

U.S. PATENT DOCUMENTS

| | | | |
|---|---|---|---|
| 5,570,093 A * | 10/1996 | Aker et al. | 342/104 |
| 5,983,154 A | 11/1999 | Morisawa | |
| 5,983,158 A * | 11/1999 | Suzuki et al. | 701/209 |
| 7,386,482 B2 * | 6/2008 | Kokatsu et al. | 705/26.61 |
| 7,869,942 B2 * | 1/2011 | Naito et al. | 701/204 |

FOREIGN PATENT DOCUMENTS

| | | |
|---|---|---|
| JP | A-09-259397 | 10/1997 |
| JP | A-10-169486 | 6/1998 |
| JP | A-2001-112121 | 4/2001 |
| JP | A-2002-188932 | 7/2002 |
| JP | B2-3417389 | 4/2003 |
| JP | A-2003-235108 | 8/2003 |
| JP | A-2004-098726 | 4/2004 |
| JP | A-2004-248455 | 9/2004 |
| JP | A-2005-091112 | 4/2005 |

* cited by examiner

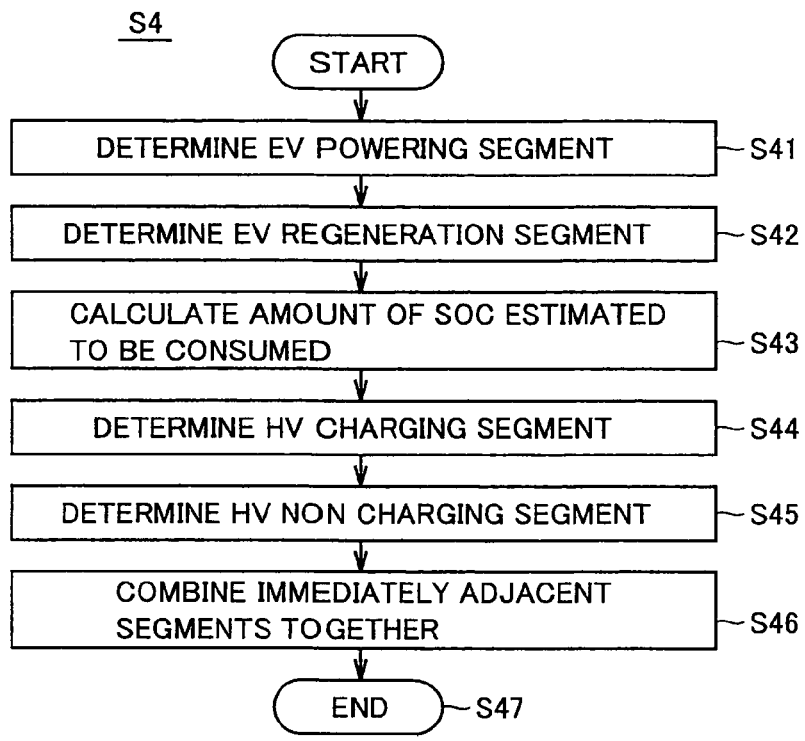
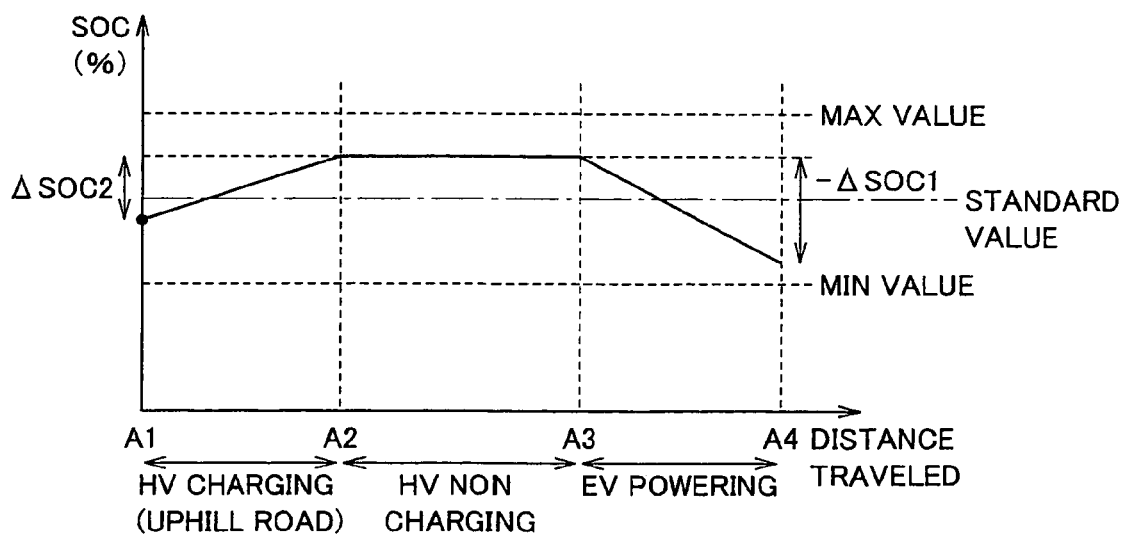

VEHICULAR DISPLAY DEVICE, METHOD OF CONTROLLING THE SAME, PROGRAM, AND STORAGE MEDIUM HAVING PROGRAM STORED THEREIN

TECHNICAL FIELD

The present invention relates to vehicular display devices, methods of controlling vehicular display devices, programs, and storage media having the programs stored therein.

BACKGROUND ART

Japanese Patent Laying-Open No. 2001-112121 discloses an electric vehicle provided with a navigation system connected to traveling control means to take in map information of the navigation system, characterized in that the traveling control means is additionally provided with a function to control traveling with the vehicle's traveling condition set in one of a normal traveling mode and an economical traveling mode.

This traveling control means determines from the map information received from the navigation system and electric power available from a main power supply for the electric vehicle whether the vehicle can reach an input destination, and if it is difficult for the vehicle to reach the destination, the traveling control means exerts control to switch the vehicle's traveling condition from the normal traveling mode to the economical traveling mode.

In recent years, a hybrid vehicle having an engine and a motor mounted therein as a drive device is gaining attention as an ecologically friendly vehicle. Such a hybrid vehicle may also be controlled, with the engine and the motor used together, to switch between an HV traveling mode and an EV traveling mode as done between the normal traveling mode and the economical traveling mode.

As technology advances, hybrid vehicles are improved in mileage. On the other hand, it is also preferable that drivers should also be conscious of better fuel economy in traveling. To raise drivers' awareness of better fuel economy in traveling, it is desirable to also enable drivers to recognize switching of traveling modes of hybrid vehicles.

Japanese Patent Laying-Open No. 2001-112121 discloses that when the normal traveling mode is switched to the economical traveling mode a monitor displays an indication accordingly. However, how the vehicle's traveling mode will subsequently be changed, i.e., how it is switched in future, cannot be obtained by the driver.

DISCLOSURE OF THE INVENTION

The present invention contemplates a display device for a hybrid vehicle that allows the driver to previously obtain future information relating to switching a traveling mode of the vehicle, a method of controlling the display device, a program causing a computer to execute the method, and a storage medium having the program stored therein.

In summary the present invention provides a display device for a vehicle having a plurality of traveling modes, comprising: a display unit displaying map information; and a control unit causing the display unit to display recognizably, at a portion of roads in the map information, traveling modes that correspond to the roads.

Preferably, the control unit sets a destination in response to an instruction received from an operator, searches for a traveling route extending from a starting point to the destination, divides the traveling route into segments, and associates one of the traveling modes with each of the segments.

More preferably, the traveling route includes a plurality of candidate traveling routes, and the control unit causes the display unit to display the plurality of candidate traveling routes, each with the traveling mode overlaid thereon, and selects in response to an instruction of the operator one traveling route planned to be taken among the plurality of candidate traveling routes.

More preferably, the control unit associates the traveling mode in accordance with information of each of the segments of the traveling route divided, and the information of each of the segments includes at least one of: presence/absence of traffic congestion; a width of the road; a legal speed limit; a gradient of the road; and a length of each of the segments.

Preferably, the vehicle is a hybrid vehicle employing an internal combustion engine and a motor together to travel and the plurality of traveling modes include a first traveling mode employing the internal combustion engine and the motor concurrently and a second traveling mode stopping the internal combustion engine and employing the motor to travel.

Preferably, the control unit causes the display unit to display the plurality of traveling modes in association with mutually different colors, respectively.

Preferably, the control unit causes the display unit to display the plurality of traveling modes in association with good/poor mileage.

The present invention in another aspect provides a method of controlling a display device for a vehicle having a plurality of traveling modes and including a display unit displaying map information, comprising the steps of: determining a traveling mode of the plurality of traveling modes of the vehicle that corresponds to a road; and causing the display unit to display recognizably, at a portion of roads in the map information, the traveling modes that correspond to the roads.

Preferably the method of controlling a display device for a vehicle further comprises the steps of: setting a destination in response to an instruction received from an operator; searching for a traveling route extending from a starting point to the destination; and dividing the traveling route into segments, wherein the step of determining associates one of the traveling modes with each of the segments.

More preferably, the traveling route includes a plurality of candidate traveling routes. The step of causing causes the display unit to display the plurality of candidate traveling routes, each with the traveling mode overlaid thereon. The method further comprises the step of selecting in response to an instruction of the operator one traveling route planned to be taken among the plurality of candidate traveling routes.

More preferably, the step of determining includes associating the traveling mode in accordance with information of each of the segments of the traveling route divided, and the information of each of the segments includes at least one of: presence/absence of traffic congestion; a width of the road; a legal speed limit; a gradient of the road; and a length of each of the segments.

Preferably the vehicle is a hybrid vehicle employing an internal combustion engine and a motor together to travel and the plurality of traveling modes include a first traveling mode employing the internal combustion engine and the motor concurrently and a second traveling mode stopping the internal combustion engine and employing the motor to travel.

Preferably the step of causing causes the display unit to display the plurality of traveling modes in association with mutually different colors, respectively.

Preferably the step of causing causes the display unit to display the plurality of traveling modes in association with good/poor mileage.

The present invention in still another aspect provides a computer readable storage medium having a program stored therein for causing a computer to execute the method of controlling a display device for a vehicle, as described above.

The present invention in still another aspect provides a program for causing a computer to execute the method of controlling a display device for a vehicle, as described above.

The present invention allows a driver to previously obtain information of future relating to switching a vehicle's traveling modes. This can increase the driver's awareness of energy conservation and also allows the driver to try variously. Consequently, improved mileage can also be expected.

BRIEF DESCRIPTION OF THE DRAWINGS

FIG. 5 is a flowchart specifically describing a step S4 shown in FIG. 4.

FIG. 6 is a diagram for illustrating a relationship between how a segment is determined as described with reference to the FIG. 5 flowchart and how SOC varies.

BEST MODES FOR CARRYING OUT THE INVENTION

Hereinafter reference will be made to the drawings to describe the present invention in embodiments. Note that in the figures, identical or corresponding components are identically denoted and will not be described repeatedly in detail.

First Embodiment

Figure 1:
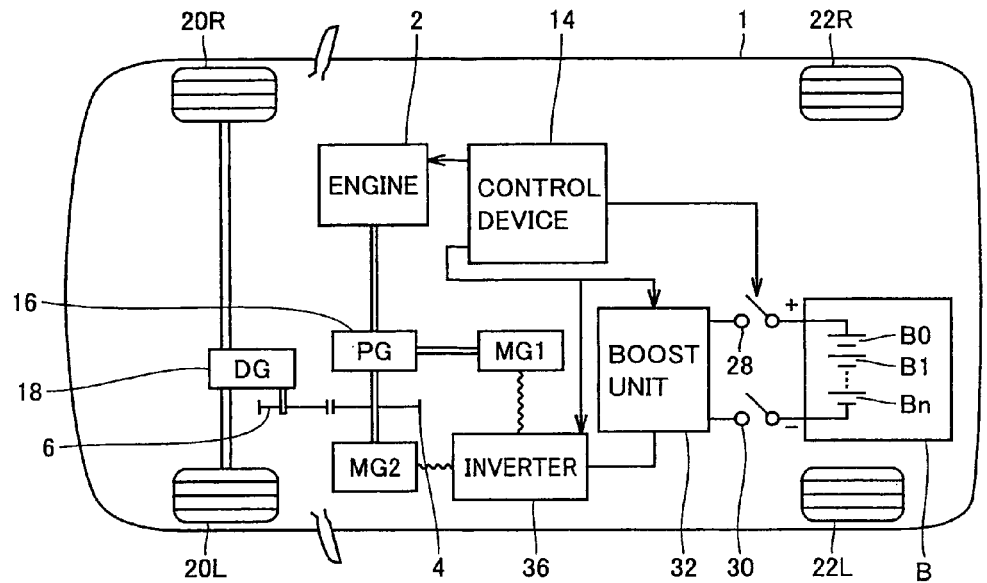
FIG. 1 shows a main configuration of a hybrid vehicle 1 of a first embodiment.

FIG. 1 shows a main configuration of a hybrid vehicle 1 of a first embodiment. Hybrid vehicle 1 is a vehicle employing an engine and a motor together for traveling.

With reference to FIG. 1, hybrid vehicle 1 includes front wheels 20R and 20L, rear wheels 22R and 22L, an engine 2, a planetary gear 16, a differential gear 18, and gears 4 and 6.

Hybrid vehicle 1 further includes a battery B disposed in the vehicle at a rear position, a boost unit 32 boosting in voltage a direct current (dc) electric power output from battery B, an inverter 36 communicating the dc electric power with boost unit 32, a motor generator MG1 coupled with engine 2 via planetary gear 16 to mainly generate electrical power, and a motor generator MG2 having a rotation shaft connected to planetary gear 16. Inverter 36 is connected to motor generators MG1 and MG2 to provide conversion between alternate current (ac) electric power and dc electric power provided from boost unit 32.

Planetary gear 16 has first, second and third rotation shafts connected to engine 2, motor generator MG1, and motor generator MG2, respectively.

The third rotation shaft has gear 4 attached thereto, and gear 4 drives gear 6 to transfer motive power to differential gear 18. Differential gear 18 receives the motive power from gear 6 and transmits the motive power to front wheels 20R and 20L, and also receives rotary force of front wheels 20R and 20L and transmits it via gears 6 and 4 to the third rotation shaft of the planetary gear.

Planetary gear 16 serves to split motive power between engine 2 and motor generators MG1 and MG2. More specifically, when rotation of two of the three rotation shafts of planetary gear 16 is determined, that of the remaining one rotation shaft will naturally be determined. Accordingly, engine 2 is operated in a most efficient range while the amount of electric power generated by motor generator MG1 is controlled, and motor generator MG2 is driven to control vehicular speed, to realize a generally energy-efficient vehicle.

A reduction gear may be provided to reduce the rotation of motor generator MG2 and transmit it to planetary gear PG, and a transmission gear may be provided to allow the reduction gear to have a variable reduction ratio.

Battery B, serving as a dc power supply, is implemented for example by a nickel metal hydride, lithium ion, or similar secondary battery, and supplies dc electric power to boost unit 32 and is also charged with dc electric power provided from boost unit 32.

Boost unit 32 boosts dc voltage received from battery B and supplies the boosted dc voltage to inverter 36. Inverter 36 receives the supplied dc voltage and converts it to ac voltage, and controls driving motor generator MG1 when the engine is started. Furthermore, after the engine is started, ac electric power generated by motor generator MG1 is converted by inverter 36 to a direct current and converted by boost unit 32 to a voltage suitable for charging battery B, and battery B is thus charged.

Furthermore, inverter 36 drives motor generator MG2. Motor generator MG2 assists engine 2 to drive front wheels 20R and 20L. In braking the vehicle, the motor generator regeneratively operates to convert the rotary energy of the wheels to electrical energy. The obtained electrical energy is returned via inverter 36 and boost unit 32 to battery B. Battery B is a set of cells including a plurality of series-connected cell units B0-Bn. Between boost unit 32 and battery B, system main relays 28, 30 are provided to disconnect high voltage when the vehicle is not operated.

Hybrid vehicle 1 further includes a control device 14. Control device 14 controls engine 2, inverter 36, boost unit 32 and system main relays 28, 30 in response to the driver's instructions and the outputs received from a variety of sensors attached to the vehicle.

Figure 2:
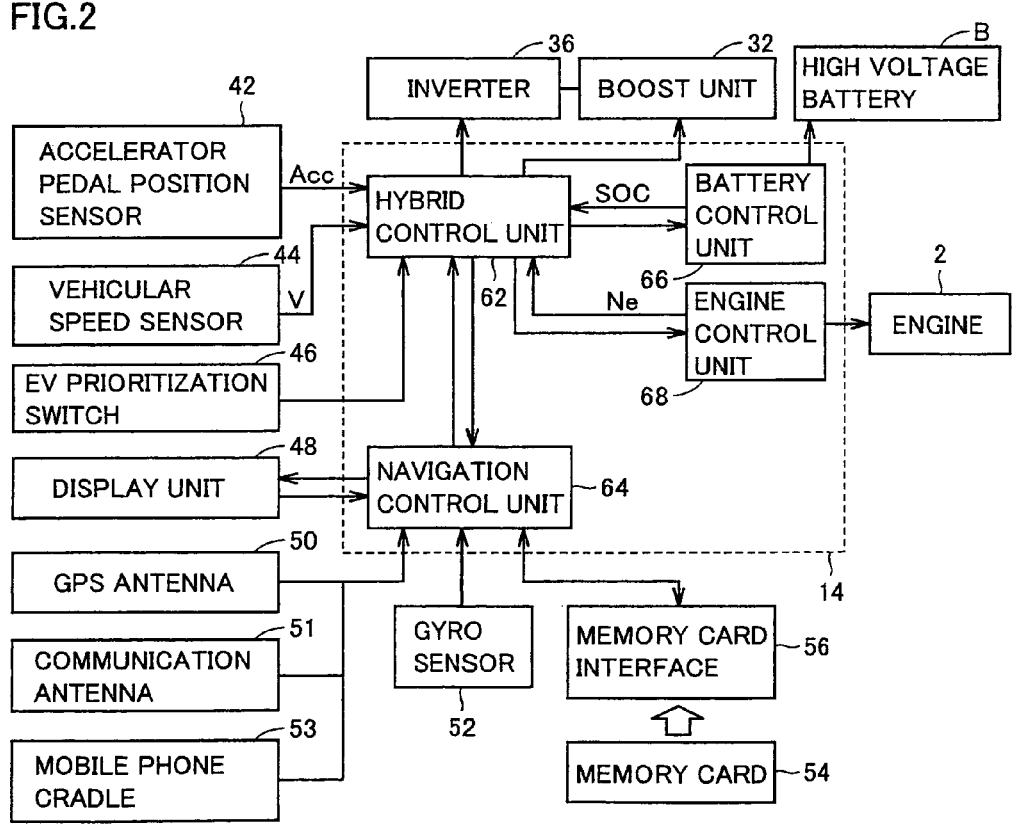
FIG. 2 is a block diagram of a function of a control device 14 of FIG. 1 and peripheral devices associated therewith.

FIG. 2 is a block diagram of a function of control device 14 of FIG. 1 and peripheral devices associated therewith. Note that control device 14 can be implemented by any of software and hardware.

With reference to FIG. 2, control device 14 includes a hybrid control unit 62, a navigation control unit 64, a battery control unit 66, and an engine control unit 68.

Battery control unit 66 obtains a state of charge (SOC) of battery B by accumulating a current charged/discharged to/from battery B and transmits it to hybrid control unit 62.

Engine control unit 68 controls a throttle for engine 2 and also detects engine speed Ne of engine 2 and transmits it to hybrid control unit 62.

Navigation control unit 64 obtains information of a destination that is set by an occupant of the vehicle from a display unit 48 including a touch display. Furthermore, navigation control unit 64 obtains the vehicle's current position through a GPS antenna 50 and a gyro sensor 52 and overlays the current position on road map data and thus displays it on display unit 48. Furthermore, navigation control unit 64 obtains traffic information of a road through a communication antenna 51 or a mobile phone cradle 53, and overlays a congested area on road map data and thus displays it on display unit 48. Furthermore, navigation control unit 64 performs a navigation operation to search for a traveling route extending from the current position to the destination and display it.

Hybrid control unit 62 calculates an output that the driver requests, or a requested power, from a signal Acc output from an accelerator pedal position sensor 42 and vehicular speed V detected by a vehicular speed sensor. Hybrid control unit 62 calculates required driving power (or total power) with the driver's requested power and in addition thereto battery B's state of charge SOC considered and furthermore calculates speed that the engine is required to achieve and power that the engine is required to output.

Hybrid control unit 62 transmits the required speed and power to engine control unit 68 to cause engine control unit 68 to control the throttle for engine 2.

Hybrid control unit 62 calculates the driver's requested torque in accordance with a traveling condition and causes inverter 36 to drive motor generator MG2, and also causes motor generator MG1 to generate electric power, as required.

Engine 2's driving power is distributed to that directly driving a wheel and that driving motor generator MG1. The sum of motor generator MG2's driving power and that of the engine for directly driving serves as the vehicle's driving power.

Furthermore, this vehicle is provided with an EV prioritization switch 46. When the driver presses EV prioritization switch 46 the engine's operation is limited. The vehicle thus in principle has the engine stopped and travels only by the driving power of motor generator MG2. The driver can press EV prioritization switch 46 to reduce noise in a residential area late at night and early in the morning and reduce exhaust gas in an indoor parking lot, a garage and the like, as required.

Keeping the engine stopped, however, may result in the battery running short or failure to obtain necessary power, and accordingly, if 1) EV prioritization switch 46 is switched off, 2) the battery has a state of charge SOC smaller than a predetermined value, 3) the vehicle attains a vehicular speed of at least a predetermined value, or 4) the accelerator pedal has a position of at least a defined value, EV prioritization switch 46 having been turned on is turned off.

Vehicle 1 is a hybrid vehicle and has a plurality of traveling modes. The vehicle's display device includes display unit 48 displaying map information, and control device 14 causing display unit 48 to display recognizably at a portion of the map information that corresponds to a road a traveling mode of vehicle 1 that corresponds to the road.

Control device 14 sets a destination in response to an instruction received from an operator, searches for a traveling route extending from a starting point to the destination, divides the traveling route into segments, and associates a traveling mode of the traveling modes with each segment of the divided traveling route.

More specifically, navigation control unit 64 performs a setting process to set a destination based on an operation performed by an occupant of the vehicle, and a searching process to set a traveling route extending from a starting point to the destination.

Navigation control unit 64 then performs a process to divide a retrieved traveling route into segments and associate a traveling mode of the traveling modes with each segment of the divided traveling route.

The retrieved traveling route includes a plurality of candidate traveling routes. Control device 14 causes display unit 48 to display the plurality of candidate traveling routes each with a traveling mode overlaid thereon, and selects one traveling route planned to be taken among the plurality of candidate traveling routes in accordance with the operator's instruction(s).

Control device 14 associates a traveling mode in accordance with information of each segment of the divided traveling route. The information of each segment includes at least one of: presence/absence of traffic congestion; the width of the road; a legal speed limit; the gradient of the road; and the length of the segment.

Vehicle 1 is a hybrid vehicle employing an internal combustion engine and a motor together when it travels, and the plurality of traveling modes include a first traveling mode employing the internal combustion engine and the motor concurrently and a second traveling mode stopping the internal combustion engine and employing the motor to travel.

Control device 14 may cause display unit 48 to display the plurality of traveling modes in association with mutually different colors, respectively. Furthermore, control device 14 may cause display unit 48 to display the plurality of traveling modes in association with good/poor mileage.

After a traveling route has been retrieved and determined and when the vehicle starts to travel, navigation control unit 64 transmits information of an associated traveling mode to hybrid control unit 62 to cause the vehicle to travel each segment in that traveling mode.

Information including a destination, a traveling route, each segment of a divided traveling route, and a traveling mode associated with each segment may be read external to the vehicle via a memory card interface 56 into navigation control unit 64. In that case, a memory card 54 has previously stored therein data created on a personal computer (not shown) and the data is read via memory card interface 56 into navigation control unit 64.

Navigation control unit 64 divides a traveling route extending from a starting point to a destination into segments each suitable for a traveling mode of the plurality of traveling modes. For example, a traveling mode is selected from the plurality of traveling modes in accordance with: the environment surrounding the road; the inclination of the road; whether the road has a curve; whether the road has a traffic signal; and the like. Note that for a vehicle having a transmission allowing a range to be switched, switching the range may be done in addition to setting a traveling mode, as described above.

Control device 14 thus described with reference to FIG. 2 can also be implemented by software using a computer.

Figure 3:
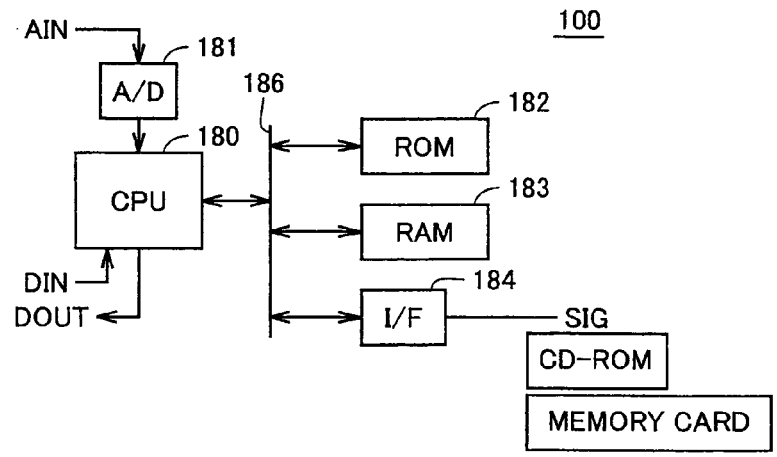
FIG. 3 shows a general configuration provided when control device 14 is implemented by a computer 100.

FIG. 3 shows a general configuration provided when control device 14 is implemented by a computer 100.

With reference to FIG. 3, computer 100 includes a CPU 180, an A/D converter 181, a ROM 182, a RAM 183, and an interface unit 184.

A/D converter 181 receives an analog signal AIN output and the like from a variety of sensors, converts the signal to a digital signal, and outputs the digital signal to CPU 180. Furthermore CPU 180 is connected through a data bus, an address bus or a similar bus 186 to ROM 182, RAM 183, and interface unit 184 to communicate data therewith.

ROM 182 has stored therein for example a program executed by and a map or similar data referenced by CPU 180. RAM 183 is a working area used for example when CPU 180 processes data, and RAM 183 stores a variety of variables or similar data temporarily.

Interface unit 184 for example: communicates with another electric control unit (ECU); inputs data to be rewritten when ROM 182 is implemented by an electrically rewritable flash memory or the like; reads a data signal SIG from a memory card, a CD-ROM, or a similar computer readable storage medium; and the like.

Note that CPU 180 communicates a data input signal DIN, a data output signal DOUT, and the like through an input/output port.

Control device 14 is not limited to such a configuration as described above, and may be implemented to include a plurality of CPUs. Furthermore, The FIG. 2 hybrid control unit 62, navigation control unit 64, battery control unit 66, and engine control unit 68 may each have such a configuration as shown in FIG. 3.

Figure 4:
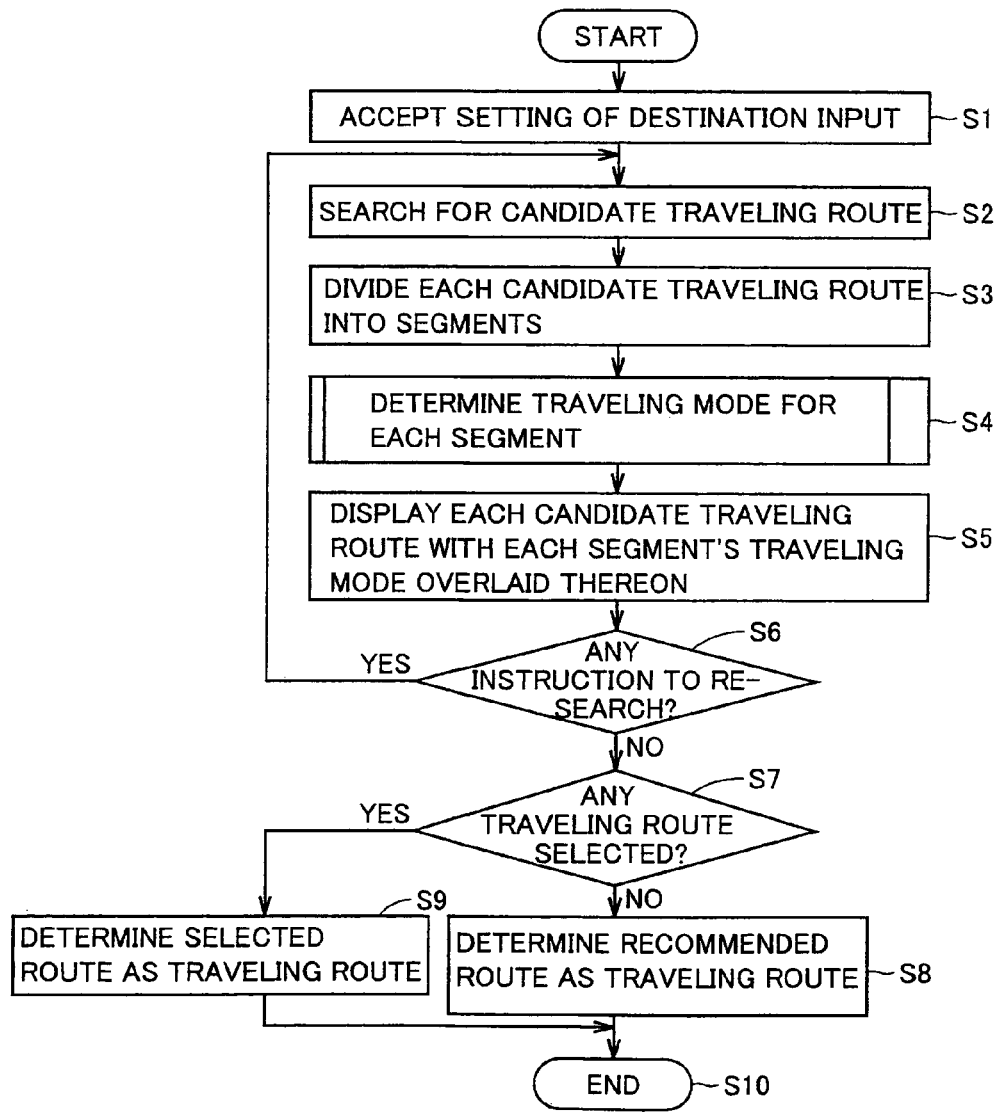
FIG. 4 is a flowchart of a structure of a process performed by control device 14 for control.

FIG. 4 is a flowchart of a structure of a process performed by control device 14 for control.

With reference to FIG. 4, initially the process starts, and step S1 is performed to accept a setting of a destination to which the vehicle travels that is input. If the operator performs the operation in the vehicle, the operator operates the touch display of display unit 48 of FIG. 2 to set the destination.

Subsequently at step S2 a candidate traveling route extending from the vehicle's current position (or the location of the home) to the destination is searched for. For the candidate traveling route, a plurality of candidates such as a recommended route, another route and the like are searched for. In addition, a highway prioritization route, a shortest distance route and the like may also be searched for as candidates. Thus searching for a route is often done in general car navigation devices, and will not be described in detail.

Subsequently at step S3 a retrieved traveling route is divided. Basically it is divided such that a segment from an intersection to another intersection serves as one unit. In addition, it is also divided at: a point at which a legal speed limit changes; a point at which a road varies in width; a point at which a road varies in gradient; and points at which a congested segment starts and ends, respectively, as obtained from information obtained through communication antenna 51, mobile phone cradle 53 and the like. Furthermore, with battery B's capacity considered, a distance that the vehicle can continuously travel by EV traveling serves as a unitary distance and any segment exceeding this unitary distance is further divided to be smaller than the unitary distance. Note that the information of the congested segment is provided by a Vehicle Information and Communication System (VICS) or a similar service.

At step S4 a traveling mode corresponding to a segment obtained at step S3 is determined. The traveling mode for example includes an electric vehicle (EV) powering mode, an EV regeneration mode, a hybrid vehicle (HV) charging mode, an HV non charging mode, and the like.

In the EV powering mode the vehicle has engine 2 stopped and in that condition employs only a motor (mainly motor generator MG2) to travel as if it were an electric vehicle. At the time, battery B's energy is consumed, and battery B thus has a gradually decreasing state of charge (SOC).

In the EV regeneration mode, as well as in the EV powering mode, the vehicle travels with engine 2 stopped. However, a motor performs regenerative braking. Thus the motor acts to generate electric power, and battery B is charged and thus has a gradually increasing SOC.

In the HV charging mode, engine 2 is in operation. Engine 2's torque is transmitted to planetary gear 16 and divided into a torque causing motor generator MG1 to generate electric power and that rotating gear 4. Gear 4 is rotated by the torque transmitted from engine 2 via planetary gear 16 and that of motor generator MG2. At the time, motor generator MG1 generates electric power larger than that used by motor generator MG2. The excessive electric power is used to charge battery B. Thus in the HV charging mode battery B has a gradually increasing SOC.

In the HV non charging mode, engine 2 is in operation. Engine 2's torque is transmitted to planetary gear 16 and divided into a torque causing motor generator MG1 to generate electric power and that rotating gear 4. Gear 4 is rotated by the torque transmitted from engine 2 via planetary gear 16 and that of motor generator MG2. At the time the electric power generated by motor generator MG1 is controlled to be equal to that used by motor generator MG2. Thus in the HV charging mode battery B does not have electric power input thereto or output therefrom, and thus has an SOC maintained as it currently is.

FIG. 5 is a flowchart specifically describing step S4 shown in FIG. 4.

With reference to FIG. 5, in step S4, initially at step S41 a segment to be set in the EV powering mode (an EV powering segment) is determined. This segment includes a segment currently congested or estimated to be congested when the vehicle reaches it, a segment having a road with little inclination (e.g., within 2%), and a segment having a legal speed limit of at most a predetermined value (for example of 40 Km/h), that are within at most a distance that the vehicle can continuously travel in view of battery B's capacity (e.g., a predetermined distance of approximately 20 Km).

It should be noted, however, that if an EV powering segment and another EV powering segment have too small a distance therebetween, battery B cannot be charged to recover its SOC. Accordingly when one EV powering segment is determined a predetermined distance following that segment (or a segment for a predetermined period of time determined with the legal speed limit and the determined segment's distance considered) is excluded as a segment that is not subject to the EV powering mode.

Step S41 is followed by step S42. At step S42 a segment traveled in the EV regeneration mode (an EV regeneration segment) is determined. This segment is basically a downhill segment. In going downhill, the driver releases the accelerator pedal and in some cases presses the brake pedal. In the vehicle, at the time, regenerative braking employing motor generator MG2 is performed. At the time, battery B is charged in an amount, which is estimated from the hourly speed of the traveling vehicle, the gradient of the road, and the distance that the vehicle travels.

At step S43, an SOC of battery B that decreases in the EV powering segment minus that of battery B that increases in the EV regeneration segment preceding the EV powering segment is calculated to obtain an amount of SOC estimated to be consumed. An amount corresponding to that of SOC estimated to be consumed must be charged to battery B previously before the EV powering segment.

Accordingly at step S44 a segment traveled in the HV charging mode (an HV charging segment) is determined for previously charging the amount corresponding to that of SOC estimated to be consumed. The traveling route excluding the EV powering, EV regeneration and HV charging segments is determined at step S45 as a segment traveled in the HV non charging mode (an HV non charging segment).

Subsequently at step S46 if segments traveled in the same mode are immediately adjacent to each other, the segments are processed to be combined together into one segment and at step S47 the process ends. Note that the step S46 combination step may not be performed.

FIG. 6 is a diagram for illustrating a relationship between how a segment is determined as described with reference to the FIG. 5 flowchart and how SOC varies.

With reference to FIG. 5 and FIG. 6, if at step S41 a segment A3-A4 is determined as an EV powering segment, an amount of electric power required to be consumed to travel the segment is calculated from the distance traveled in the segment and the speed estimated for the segment, and an amount of SOC consumed that corresponds thereto (i.e., $-\Delta SOC1$) is obtained.

The battery must not have an SOC over an upper limit for management (a MAX value) at point A3 and below a lower limit for management (a MIN value) at a point A4. Accordingly, the battery must be charged between points A1-A3 to satisfy this condition if the battery has an SOC having decreased by $\Delta SOC1$ since the vehicle passed point A3. The amount charging the battery is not limited as described above, and is set for example at $\Delta SOC2$ to allow a median or (mean value) of SOCs at points A3 and A4, respectively, to match a standard SOC value.

Figure 7:
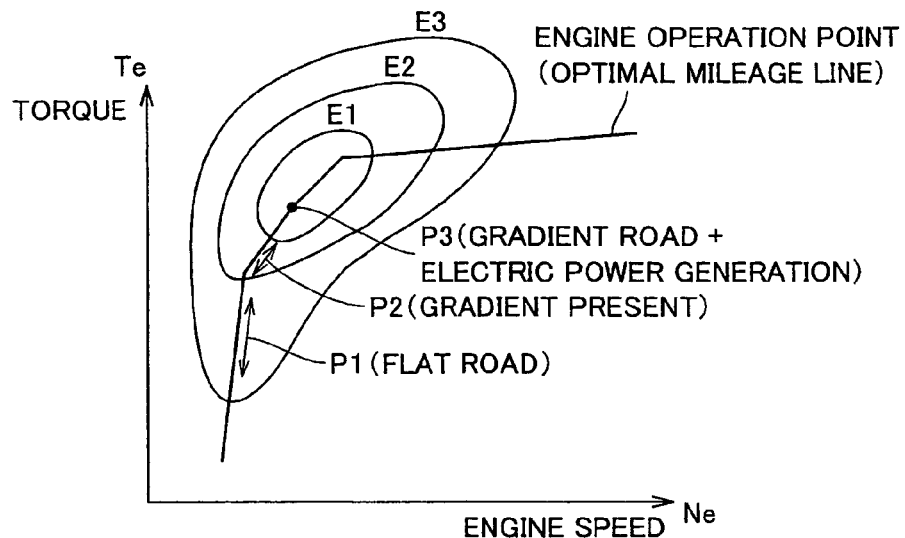
FIG. 7 is a diagram for illustrating how an HV charging segment is determined.

FIG. 7 is a diagram for illustrating how an HV charging segment is determined.

FIG. 7 has a horizontal axis representing engine speed Ne and a vertical axis representing engine torque Te. The engine has an operation point controlled to move on an optimal mileage line. E1-E3 denote energy efficiency contour lines, with E1 indicating the most efficient range and E2 and E3 being lower in energy efficiency than E1 and E2, respectively.

When the vehicle travels with the engine and the motor both used, or in a hybrid manner, on a flat road, the vehicle does not require large torque and accordingly, as indicated by P1, the engine speed is also kept low. This state, however, belongs to range E3 and is not so good in energy efficiency.

In contrast, when the vehicle climbs uphill or a road similarly having a gradient, the vehicle requires torque, and, as indicated by P2, the engine speed slightly increases. In this state, range E2 is entered and energy efficiency is also slightly improved.

When the battery is charged, the engine experiences further load. Herein, rather than imposing a load on the engine with flat road P1 traveled, imposing a load on the engine with gradient road P2 traveled provides a better state in energy efficiency, as indicated by P3. Accordingly, for a portion corresponding to P1, the vehicle travels with the engine stopped and by a motor. On an uphill road, also charging the battery to attain a good state in energy efficiency, as indicated by P3, leads to general improvement in mileage.

Accordingly in the FIG. 5 at step S44 an HV charging segment is determined to be allotted preferentially to an uphill road. In FIG. 6 a segment A1-A2 of uphill road is determined as an HV charging segment and the remaining segment A2-A3 is determined as an HV non charging segment.

Thus when the FIG. 4 step S4 ends, then step S5 is performed to display each candidate traveling route with each segment's traveling mode overlaid thereon.

Figure 8:
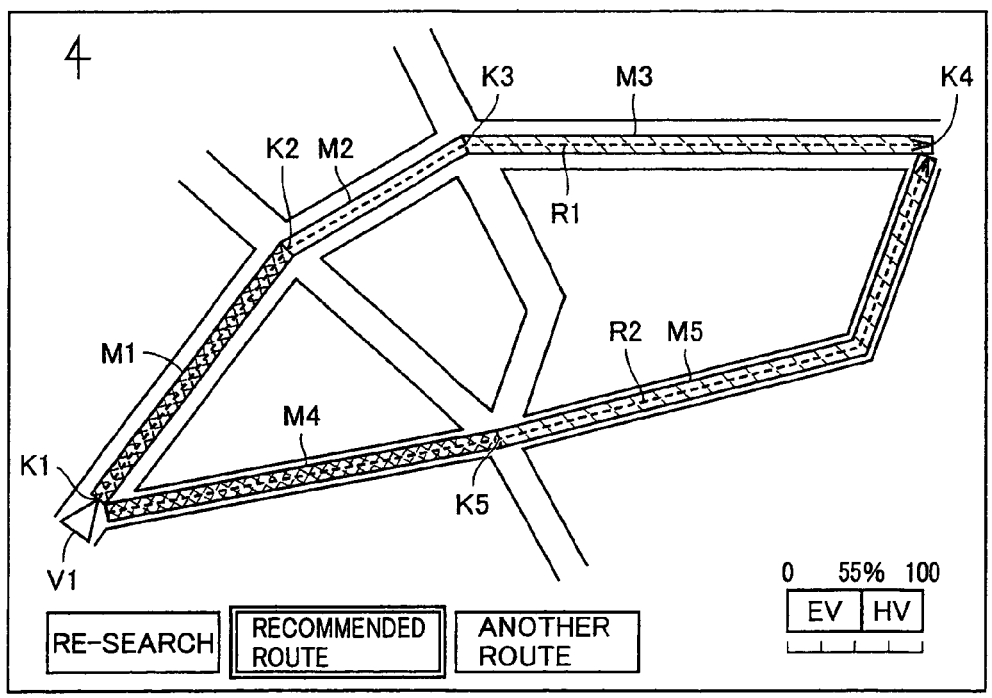
FIG. 8 shows an example of a display screen having undergone a step S5 shown in FIG. 4.

FIG. 8 shows an example of a display screen having undergone step S5 shown in FIG. 4.

With reference to FIG. 8, candidate traveling routes R1, R2 have been retrieved.

The vehicle's current position indicated by a mark V1 is displayed on the screen at a lower left corner. Candidate traveling route R1 is divided at intersections K1, K2, K3, and K4 into segments M1-M3. Candidate traveling route R2 is divided at intersections K1, K5, K4 into segments M4, M5.

Segments M1, M4 are determined as HV charging segments. Segment M2 is determined as an HV non charging segment. Segments M3, M5 are determined as EV powering segments. These segments are colored differently for each type of segment and thus displayed. For example, the HV charging segment is indicated by a red line, the EV powering segment is indicated by a blue line, and the HV non charging segment is indicated by a yellow line. Thus coloring differently can help the driver to determine which candidate traveling route should be selected.

Thus a plurality of traveling modes may be displayed to correspond to mutually different colors, respectively, or the EV regeneration mode, the EV powering mode, and the HV charging mode may be displayed with indications "good mileage", "normal mileage" and "poor mileage", respectively, (indicated by textual characters, marks associated therewith, or the like).

As a button to be pressed to select candidate traveling route R2, a "recommended route" button is displayed on the touch panel. Furthermore, as a button to be pressed to select candidate traveling route R1, an "another route" button is displayed on the touch panel.

The screen shows a state with the "recommended route" button pressed to select candidate traveling route R2. In this case, the screen indicates at a lower right corner a ratio of HV traveling with the engine operated and EV traveling with the engine stopped. The exemplary screen shows that the EV traveling has a ratio of 55%. Indicating by a ratio can help to determine which candidate traveling route should be selected if a map is displayed on a large scale and cannot display the color of each segment.

Note that at a left side of the "recommended route" button a "re-search" button is provided. In FIG. 4 at step S6 if the "re-search" button is pressed, the control returns to step S2 to search for a candidate traveling route.

At step S6 if no instruction is received to re-search a traveling route, then at step S7 a decision is made on whether there is a traveling route selected. A traveling route is selected by an occupant pressing the "recommended route", "another route" or a like button indicated on the touch panel.

If at step S7 there has not been made any particular selection, i.e., if there is no selection made and a "start guiding" button is pressed or the vehicle starts traveling, then the control proceeds to step S8 and a recommended route is determined as a traveling route.

In contrast, if at step S7 the "recommended route", "another route" or a similar select button is pressed, then the control proceeds to step S9 and a selected route is determined as a traveling route.

When step S8 or S9 ends, then the control proceeds to step S10 to end a process determining a traveling route.

Thus the present embodiment of the present invention in one aspect provides a method of controlling a display device for a vehicle having a plurality of traveling modes and including display unit 48 displaying map information, comprising the steps of: determining a traveling mode of the plurality of traveling modes of vehicle 1 that corresponds to a road (S4); and causing display unit 48 to display recognizably at a portion of the map information that corresponds to the road the traveling mode of the plurality of traveling modes of vehicle 1 that corresponds to the road (S5).

Preferably the method of controlling a display device for a vehicle further comprises the steps of: setting a destination in response to an instruction received from an operator (S1); searching for a traveling route extending from a starting point to the destination (S2); and dividing the traveling route into segments (S3), wherein the step of determining (S4) includes associating the traveling mode of the traveling modes with each of the segments.

More preferably, the traveling route includes a plurality of candidate traveling routes (R1, R2). The step of causing (S5) includes causing display unit 48 to display the plurality of candidate traveling routes, each with the traveling mode overlaid thereon. The method further comprises the step of selecting in response to an instruction of the operator one traveling route planned to be taken among the plurality of candidate traveling routes (S7).

More preferably, the step of determining (S4) includes associating the traveling mode in accordance with information of each of the segments of the traveling route divided, and the information of each of the segments includes at least one of: presence/absence of traffic congestion; a width of the road; a legal speed limit; a gradient of the road; and a length of each of the segments.

Preferably vehicle 1 is a hybrid vehicle employing an internal combustion engine and a motor together to travel and the plurality of traveling modes include a first traveling mode employing the internal combustion engine and the motor concurrently (the HV charging mode or the HV non charging mode) and a second traveling mode stopping the internal combustion engine and employing the motor to travel (the EV regeneration mode or the EV powering mode).

Hereinafter a process performed while the vehicle is traveling will be described.

Figure 9:
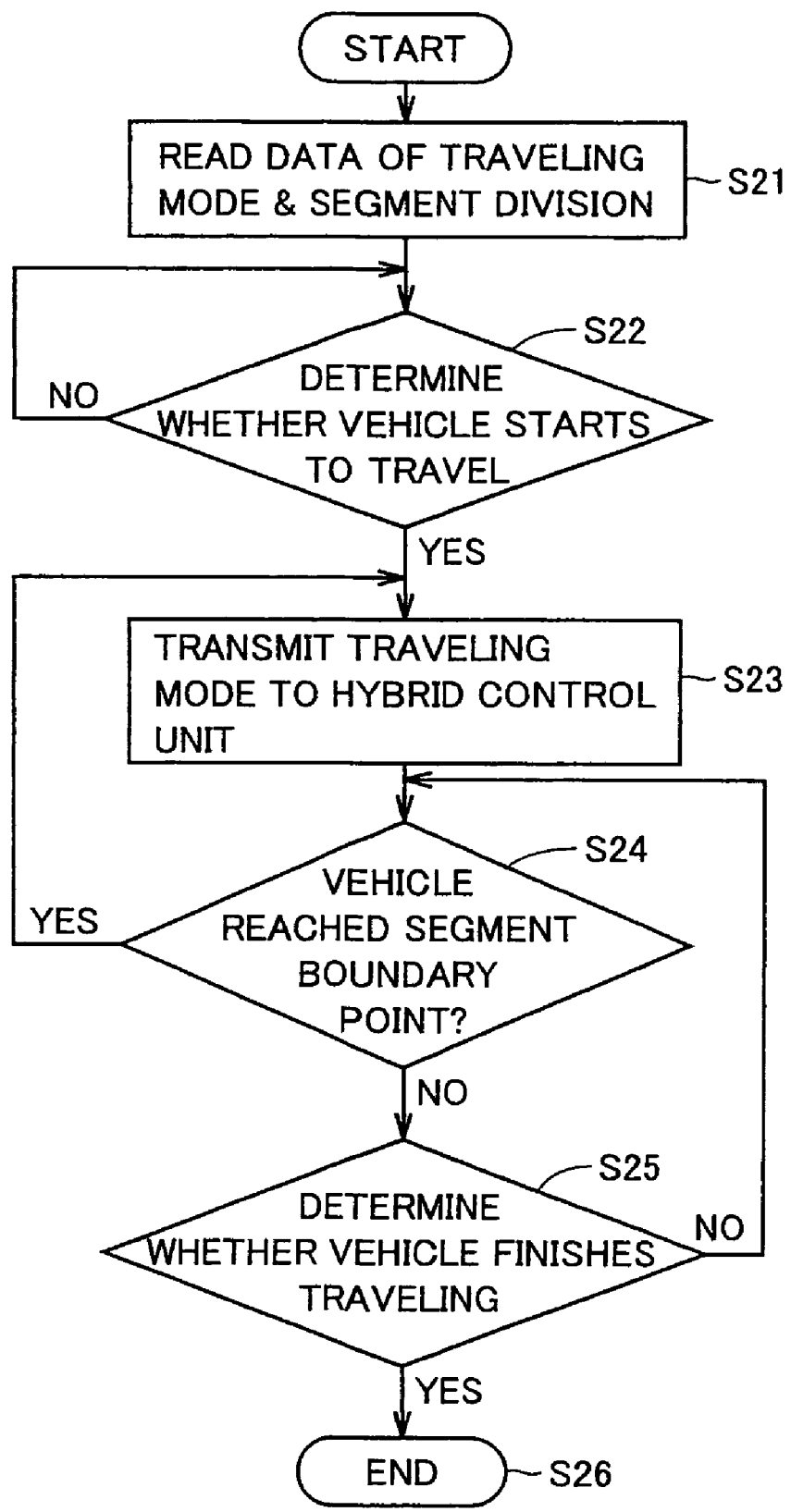
FIG. 9 is a flowchart of a process performed in a navigation control unit 64 when a vehicle is traveling.

FIG. 9 is a flowchart of a process performed in navigation control unit 64 when the vehicle is traveling.

With reference to FIG. 9, the process is started, and at step S21 traveling mode and segment division data is read. This data is stored on a memory, a hard disc or a similar storage device when the process of the FIG. 4 flowchart ends.

Subsequently step S22 is performed to determine whether the vehicle starts to travel. For example, if step S21 is followed by pressing a "start traveling" button on the touch display or the driver pressing the accelerator pedal, a decision is made that the vehicle starts to travel, and the process proceeds through step S22 to step S23.

At step S23, navigation control unit 64 transmits to hybrid control unit 62 information indicating a traveling mode corresponding to the vehicle's current position. Hybrid control unit 62 receives the transmitted information, and if the information indicates the HV charging mode or the HV non charging mode, hybrid control unit 62 causes the vehicle to travel with the engine operated. If the information indicates the EV powering mode or the EV regeneration mode then hybrid control unit 62 causes the vehicle to travel in principle with the engine stopped.

It should be noted, however, that hybrid control unit 62 modifies a traveling mode in accordance with conditions such as if: 1) EV prioritization switch 46 is operated; 2) battery B has a state of charge SOC, as measured, smaller than a predetermined value; 3) vehicular speed V has at least a predetermined value; 4) an accelerator pedal position Acc has at least a defined value; or the like.

Subsequently at step S24 the vehicle's current positional information is compared with segment boundary point information and a decision is made on whether the vehicle has reached a segment boundary point. The segment boundary point, for example in FIG. 8, is points K2, K3 for candidate traveling route R1 and point K5 for candidate traveling route R2.

In such a case, the process returns from step S24 to step S23 and navigation control unit 64 notifies hybrid control unit 62 of a traveling mode of a segment to now be traveled.

For example if in FIG. 8 the vehicle travels segment M1, and the vehicle's current position has reached point K2, generating electric power is stopped with the engine kept operated. Furthermore, if the vehicle travels segment M2, and the vehicle's current position has reached point K3, then the engine is stopped.

If the vehicle is traveling within a segment and has not yet reached a boundary point, then the process proceeds from step S24 to step S25. At step S25 a decision is made on whether the vehicle finishes traveling. For example, this decision is made for example when the vehicle's current position arrives at a set destination or a "stop guiding" button displayed on the touch panel for car navigation is pressed or the like, and the control proceeds to step S26 to end the process. If at step S25 a decision is not made that the vehicle has finished traveling, then step S24 is again performed and whether the vehicle's current position has reached a segment boundary point is continuously monitored.

Note that notifying the driver, with no destination set, of a road allowing EV traveling may also help the driver to determine a traveling route.

Figure 10:
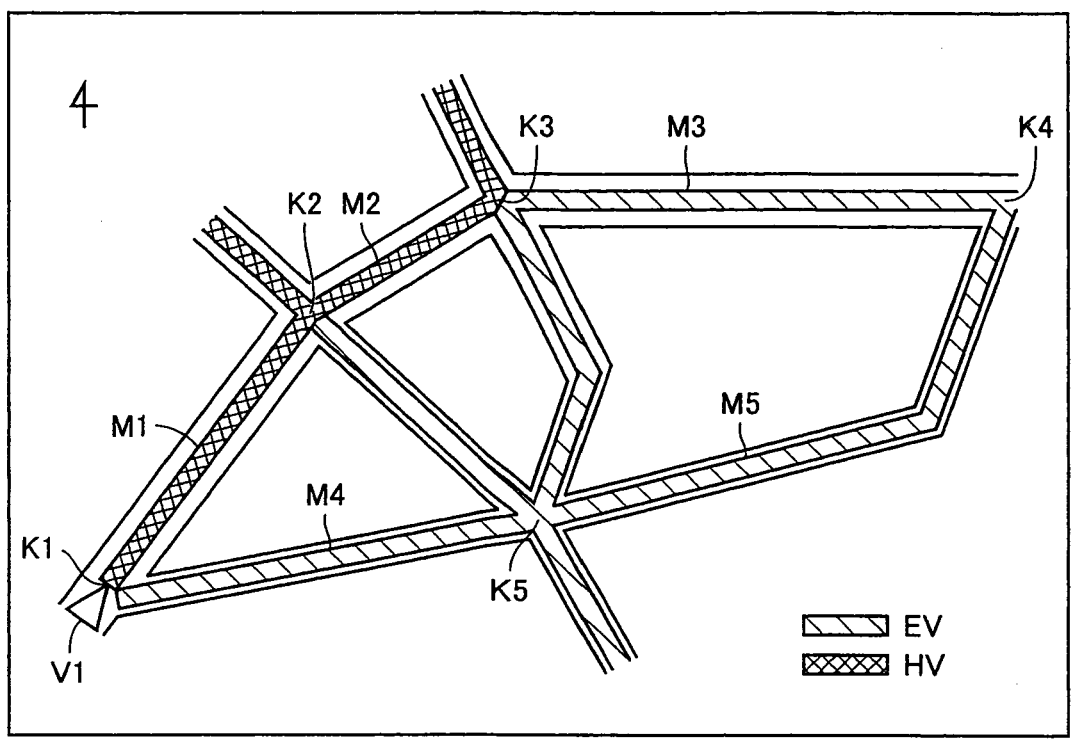
FIG. 10 shows an example of a display screen with no destination set.

FIG. 10 shows an example of a display screen with no destination set.

In the FIG. 10 example, a segment of a road in a displayed area that is suitable for EV traveling is indicated for example in green. A segment selected as being suitable for EV traveling is for example a segment of a road that does not have large inclination (e.g., at most 2%) and has a legal speed limit of at most 60 Km. Any segment other than that suitable for EV traveling is indicated for example in red as a segment traveled by HV traveling. This allows the driver to select and drive a traveling route having as many portions indicated in green as possible.

It should be noted however that the vehicle may travel in a traveling mode different from an indication on the screen because of such grounds as that: as the driver presses the accelerator pedal to accelerate the vehicle; there is a difference between actual vehicular speed and a legal speed limit; battery B is decreased in SOC; or the like.

In contrast to the FIG. 8 example, FIG. 10 shows that for any road on the display screen, information on whether the road is suitable for EV traveling is provided by color, regardless of whether the road is a traveling route. The driver can thus reference this to select and drive a route. This could be said to be a method of use similar to that in which if the VICS or a similar system renders services to display a congested traffic segment on a map the driver can reference it to bypass that segment and drive.

Note that while FIG. 10 shows an indication displayed for the segments of any road displayed, a distinction of EV/HV may be displayed only for highroad, or the indication may be omitted for sideways, depending on the scale of the map of interest.

In the present embodiment a driver can previously obtain information of future relating to switching a vehicle's traveling modes. This can increase the driver's awareness of energy conservation and also allows the driver to try variously. Consequently, improved mileage can also be expected.

Second Embodiment

Figure 11:
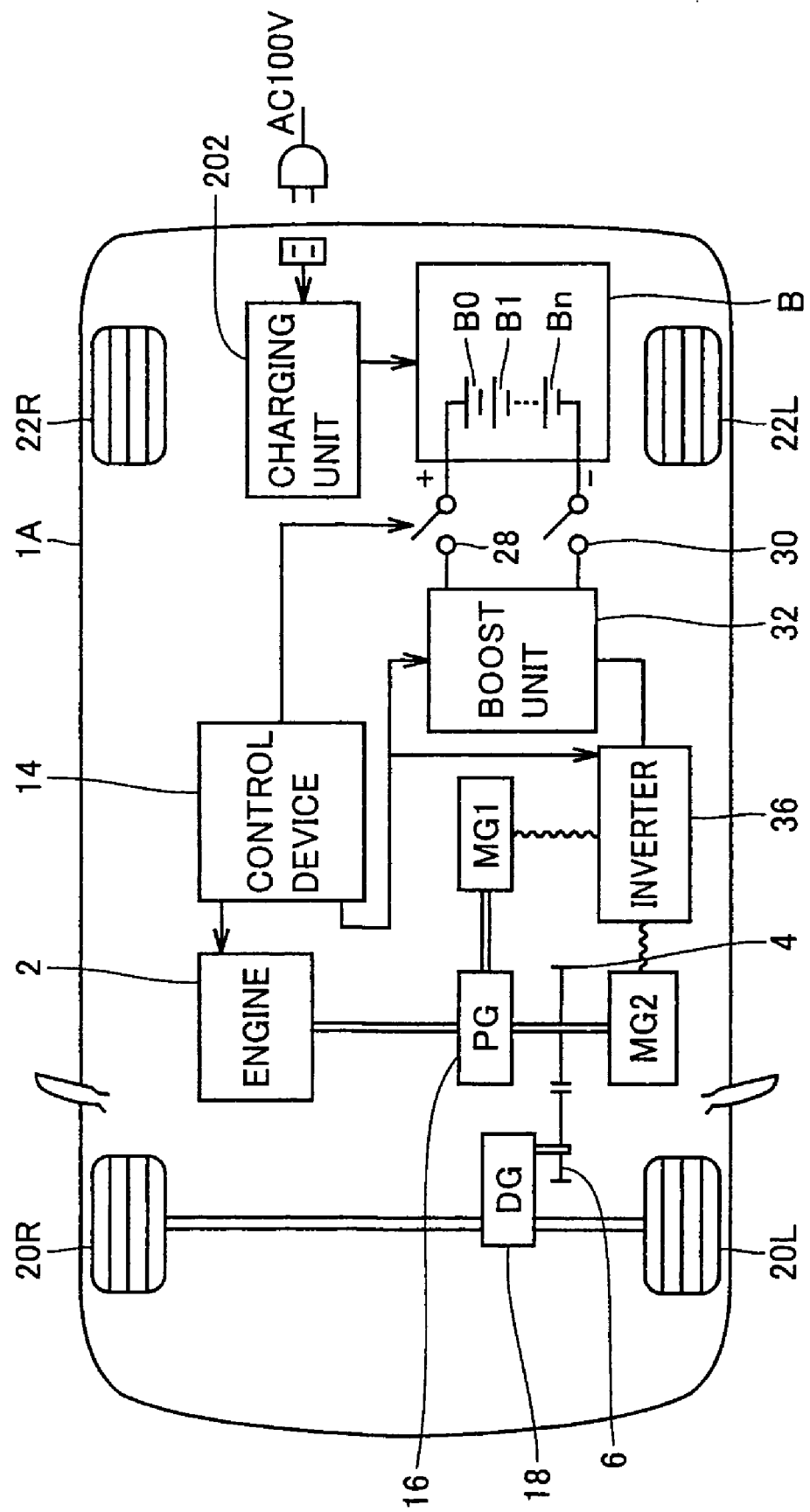
FIG. 11 shows a configuration of a vehicle 1A in a second embodiment.

FIG. 11 shows a configuration of a vehicle 1A in a second embodiment.

The FIG. 11 vehicle 1A has the configuration of the FIG. 1 vehicle 1 and in addition thereto a charging unit 202 for externally charging battery B. Charging unit 202 for example receives and converts household commercial power supply AC of 100V to direct current to provide battery B with charging voltage.

Note that for the remainder vehicle 1A has a configuration similar to vehicle 1 described with reference to FIG. 1. Accordingly it will not be described repeatedly.

Such an externally chargeably configured vehicle has a battery of a large capacity mounted therein, and while the vehicle is parked at home or the like at night the battery is charged from the commercial power supply. It is desirable that when the vehicle having left home for work comes back home the battery can again be charged with a large amount of electric power.

Figure 12:
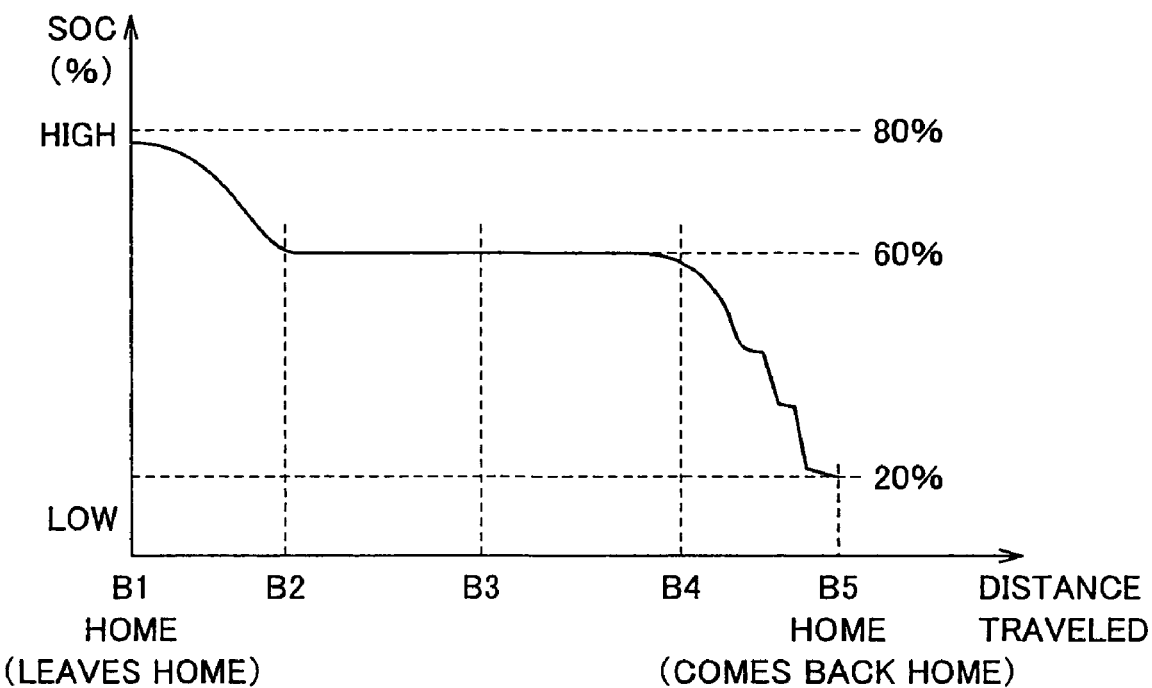
FIG. 12 represents a relationship between a distance that a vehicle travels after it leaves home before it comes back home and how SOC varies.

FIG. 12 represents a relationship between a distance that the vehicle travels after it leaves home before it comes back home and how SOC varies.

As shown in FIG. 12, initially at a point B1, or when the vehicle leaves home, battery B has an SOC close to the upper limit for management (e.g., 80%), as the battery has been charged at night.

After the vehicle has left home, the vehicle is driven in the EV powering mode for a while. Accordingly, between B1-B2, the battery has a gradually decreasing SOC. This is done to allow the battery to receive electric power generated while the vehicle is traveling when it is regeneratively braked.

When the vehicle reaches point B2, the SOC reaches a predetermined value (e.g., 60%), and between B2-B4 the engine is operated to drive the vehicle in the HV non charging, traveling mode. As a result the battery has an SOC held substantially at a constant value.

Subsequently when the vehicle goes home, and has reached point B4 or within a predetermined distance to the home, then between points B4-B5 the vehicle travels in the EV powering mode and the SOC is managed to gradually decrease to be close to the lower limit value (e.g., 20%).

Figure 13:
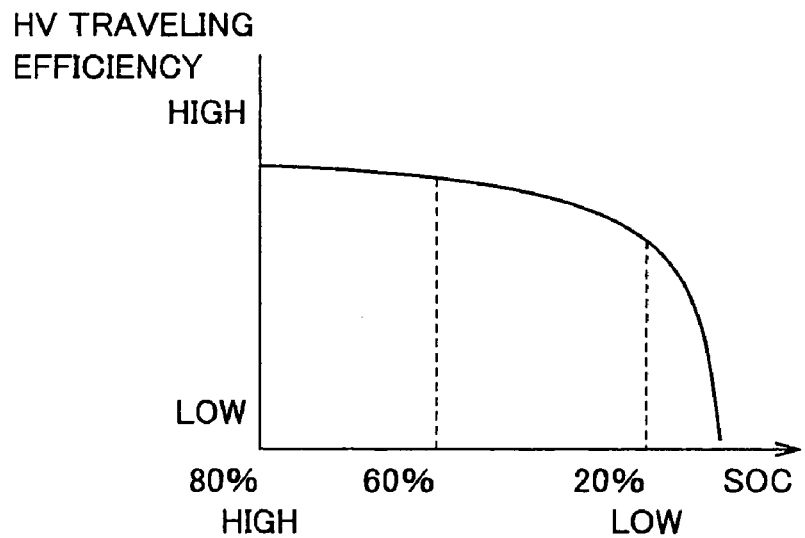
FIG. 13 shows how energy efficiency varies in an HV non charging, traveling mode.

FIG. 13 shows how energy efficiency varies in the HV non charging, traveling mode.

The battery's SOC has upper and lower limit values set for example at 80% and 20%, respectively, for management. In this range the vehicle can travel in the HV non charging, traveling mode. However, as shown in FIG. 13, if the SOC is too close to the lower limit value for management, energy efficiency decreases. For example between an SOC of 60% and that of 20% there is a difference in mileage of several percents.

Accordingly, as shown in FIG. 13, when the vehicle travels in the HV non charging, traveling mode it is desirable that there is an SOC of approximately 60%. To achieve this, using the battery's electric power when the vehicle comes very close to home (or reaches point B4), as shown in FIG. 12, is better, rather than consuming the battery's electric power close to the lower limit value for management immediately after the vehicle leaves home.

More specifically, if the vehicle leaves home with a destination set at point B3, an indication is displayed on a display screen to travel in the EV powering mode for segment B1-B2 and an indication is displayed on the display screen to travel in the HV non charging, traveling mode for segment B2-B3.

Then at point B3 when a "go home" button is pressed and a destination is set at the home, then, with available SOC considered, an indication is displayed on the display screen to travel a flat portion of segment B4-B5 in the EV powering mode. For the portion of B3-B5 excluding the flat portion, an indication is displayed on the screen to travel in the HV non charging, traveling mode. Note that the display screen exemplified is basically similar to FIG. 8, and accordingly will not be described repeatedly.

Thus an externally chargeable hybrid vehicle, as well as in the first embodiment, can have a traveling mode displayed on a screen to allow the driver to know switching of the traveling mode.

This can increase the driver's awareness of energy conservation and also allows the driver to try variously. Consequently, improved mileage can also be expected.

While navigation control unit 64 has been described to determine a traveling mode, navigation control unit 64 may provide the vehicle's current positional information, traveling route information and the like and the hybrid control unit may perform segment division and determine a traveling mode.

Furthermore, the method of controlling, as disclosed in the above embodiments, can be implemented by software using a computer. A program causing a computer to execute the method may be read into a computer internal to a control device of a vehicle from a storage medium (e.g., ROM, CD-ROM, a memory card) having the program 5. stored therein readably by the computer, or may be provided through a communication line.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

The invention claimed is:

1. A display device for a vehicle having a plurality of traveling modes, comprising:
 a display unit displaying map information; and
 a control unit causing said display unit to display recognizably, at a portion of roads in said map information, traveling modes that correspond to said roads, wherein:
 said control unit sets a destination in response to an instruction received from an operator, searches for a plurality of candidate traveling routes extending from a starting point to said destination, divides said candidate traveling routes into segments, and associates one of said traveling modes with each of said segments; and
 said control unit causes said display unit to display said plurality of candidate traveling routes, each with said traveling mode overlaid thereon, selects in response to an instruction of said operator one traveling route planned to be taken among said plurality of candidate traveling routes, and causes said display unit to display at what ratio said plurality of traveling modes occupy said traveling route planned to be taken that is selected.

2. The display device for a vehicle according to claim 1, wherein:
 said control unit associates said traveling mode in accordance with information of said each of said segments of said traveling route divided; and said information of said each of said segments includes at least one of:

presence/absence of traffic congestion; a width of said road; a legal speed limit; a gradient of said road; and a length of said each of said segments.

3. The display device for a vehicle according to claim 1, wherein:
said vehicle is a hybrid vehicle employing an internal combustion engine and a motor together to travel; and
said plurality of traveling modes include a first traveling mode employing said internal combustion engine and said motor concurrently, and a second traveling mode stopping said internal combustion engine and employing said motor to travel.

4. The display device for a vehicle according to claim 1, wherein said control unit causes said display unit to display said plurality of traveling modes in association with mutually different colors, respectively.

5. The display device for a vehicle according to claim 1, wherein said control unit causes said display unit to display said plurality of traveling modes in association with good poor mileage.

6. A method of controlling a display device for a vehicle having a plurality of traveling modes and including a display unit displaying map information, comprising the steps of:
determining a traveling mode of said plurality of traveling modes of said vehicle that corresponds to a road;
causing said display unit to display recognizably, at a portion of roads in said map information, traveling modes that correspond to said roads;
setting a destination in response to an instruction received from an operator;
searching for a plurality of candidate traveling routes extending from a starting point to said destination;
dividing said candidate traveling routes into segments, wherein the step of determining associates one of said traveling modes with each of said segments and wherein the step of causing causes said display unit to display said plurality of candidate traveling routes, each with said traveling mode overlaid thereon; and
selecting in response to an instruction of said operator one traveling route planned to be taken among said plurality of candidate traveling routes, and causing said display unit to display at what ratio said plurality of traveling modes occupy said traveling route planned to be taken that is selected.

7. The method of controlling a display device for a vehicle according to claim 6, wherein:
the step of determining includes associating said traveling mode in accordance with information of said each of said segments of said traveling route divided; and
said information of said each of said segments includes at least one of:
presence/absence of traffic congestion; a width of said road; a legal speed limit; a gradient of said road; and a length of said each of said segments.

8. The method of controlling a display device for a vehicle according to claim 6, wherein:
said vehicle is a hybrid vehicle employing an internal combustion engine and a motor together to travel; and
said plurality of traveling modes include a first traveling mode employing said internal combustion engine and said motor concurrently, and a second traveling mode stopping said internal combustion engine and employing said motor to travel.

9. The method of controlling a display device for a vehicle according to claim 6, wherein the step of causing causes said display unit to display said plurality of traveling modes in association with mutually different colors, respectively.

10. The method of controlling a display device for a vehicle according to claim 6, wherein the step of causing causes said display unit to display said plurality of traveling modes in association with good poor mileage.

11. A computer readable storage medium having a program stored therein for causing a computer to execute the method of controlling a display device for a vehicle, as recited in claim 6.

12. A program for causing a computer to execute the method of controlling a display device for a vehicle, as recited in claim 6.

13. A computer readable storage medium having a program stored therein for causing a computer to execute the method of controlling a display device for a vehicle, as recited in claim 7.

14. A computer readable storage medium having a program stored therein for causing a computer to execute the method of controlling a display device for a vehicle, as recited in claim 8.

15. A computer readable storage medium having a program stored therein for causing a computer to execute the method of controlling a display device for a vehicle, as recited in claim 9.

16. A computer readable storage medium having a program stored therein for causing a computer to execute the method of controlling a display device for a vehicle, as recited in claim 10.

17. A program for causing a computer to execute the method of controlling a display device for a vehicle, as recited in claim 7.

18. A program for causing a computer to execute the method of controlling a display device for a vehicle, as recited in claim 8.

19. A program for causing a computer to execute the method of controlling a display device for a vehicle, as recited in claim 9.

20. A program for causing a computer to execute the method of controlling a display device for a vehicle, as recited in claim 10.

* * * * *